(12) United States Patent     (10) Patent No.: US 12,367,685 B2
Rivas     (45) Date of Patent: Jul. 22, 2025

(54) COMBINED VEHICLE INTERIOR MONITORING SYSTEM

(71) Applicant: ZF FRIEDRICHSHAFEN AG, Friedrichshafen (DE)

(72) Inventor: Anthony Rivas, Royal Oak, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 388 days.

(21) Appl. No.: 18/100,854

(22) Filed: Jan. 24, 2023

(65) Prior Publication Data

US 2024/0249529 A1     Jul. 25, 2024

(51) Int. Cl.
*G06V 20/58* (2022.01)
*B60W 50/04* (2006.01)
*G01S 17/89* (2020.01)

(52) U.S. Cl.
CPC ........... *G06V 20/58* (2022.01); *B60W 50/045* (2013.01); *G01S 17/89* (2013.01); *B60W 2420/403* (2013.01); *B60W 2420/408* (2024.01)

(58) Field of Classification Search
CPC .. G06V 20/58; G01S 17/89; B60W 2420/403; B60W 2420/408
USPC ......................................................... 382/104
See application file for complete search history.

(56) References Cited

U.S. PATENT DOCUMENTS 6,768,944 B2 * 7/2004 Breed .................. B60W 40/06
213/36
2013/0321627 A1 * 12/2013 Turn, Jr. ................ H04N 23/21
348/148

* cited by examiner

*Primary Examiner* — Allen H Nguyen
(74) *Attorney, Agent, or Firm* — Brooks Kushman, P.C.

(57) ABSTRACT

A monitoring system for an interior of a vehicle comprising: a housing having a first side and defining a radar opening and a camera opening at the first side; a radar transceiver disposed within the housing and exposed at least in part at the radar opening; a camera assembly disposed within the housing and having a lens extending at least partially through the camera opening; at least one illumination device arranged on the first side of the housing and at least partially contained within the housing; and a filter cover arranged over at least the radar opening and illumination device on the first side of the housing for filtering visible light.

20 Claims, 1 Drawing Sheet

COMBINED VEHICLE INTERIOR MONITORING SYSTEM

TECHNICAL FIELD

The present disclosure relates generally to a monitoring system for an interior of a vehicle.

BACKGROUND

Vehicles on the road today include numerous sensors and systems inside and outside of the vehicle to facilitate vehicle features, including autonomous features. As the vehicle functions and features are continuously increasing, so are the number of sensors that may be included in and on a vehicle. This may increase installation efforts, time, and costs.

SUMMARY

A monitoring system for an interior of a vehicle comprising: a housing having a first side and defining a radar opening and a camera opening at the first side; a radar transceiver disposed within the housing and exposed at least in part at the radar opening; a camera assembly disposed within the housing and having a lens extending at least partially through the camera opening; at least one illumination device arranged on the first side of the housing and at least partially contained within the housing; and a filter cover arranged over at least the radar opening and illumination device on the first side of the housing for filtering visible light is disclosed.

The housing may be formed of a heat conducting material. The housing may be formed of a material containing metal. The housing may be formed of at least one of aluminum, copper, or steel.

The illumination device may be configured to produce near-infrared light having wavelengths between about 800 nm and 2,500 nm.

The camera assembly may be configured to capture visible light having wavelengths between about 400 nm and 700 nm.

The radar transceiver may be configured to transmit and detect electromagnetic waves having a wavelength between about 0.3 and 0.5 cm.

The filter cover may be formed of at least one material selectively transparent to near-infrared light having wavelengths between about 800 nm and 2,500 nm and at least one material selectively transparent to radio waves having wavelengths between about 0.3 and 0.5 cm. The filter cover may include a set of filters, each of the set of filters selectively transparent to near-infrared light or radio waves. The filter cover may be formed of at least one material configured to filter wavelengths between about 400 nm and 700 nm.

In one example, the filter cover is arranged over the radar transceiver and at least one illumination device. In such an exemplary arrangement, the camera assembly is configured to capture visible light having wavelengths between about 400 nm and 700 nm and/or between 800 nm and 2500 nm.

In one example, the filter cover is arranged over the radar transceiver, the at least one illumination device, and the camera assembly lens. In such an exemplary arrangement, the filter cover is configured to filter light received at the camera assembly to near-infrared light having wavelengths between about 800 nm and 2,500 nm and camera assembly is configured to capture near-infrared light having wavelengths between about 800 nm and 2,500 nm.

A monitoring system for an interior of a vehicle comprising: a housing having a first side and defining a radar opening and a camera opening at the first side; a radar transceiver disposed within the housing and exposed at the radar opening; a camera assembly disposed within the housing and having a lens extending at least partially through the camera opening; at least one illumination device arranged on the first side of the housing and at least partially contained within the housing, the at least one illumination device producing near-infrared light having wavelengths between about 800 nm and 2,500 nm; and a filter cover arranged over at least the radar opening and illumination device on the first side of the housing, the filter cover comprising at least one material selectively transparent to near-infrared light having wavelengths between about 800 nm and 2,500 nm and at least one material selectively transparent to radio waves having wavelengths between about 0.3 and 0.5 cm and configured to filter wavelengths between about 400 nm and 700 nm is disclosed.

The filter cover is arranged over the radar transceiver and at least one illumination device. The filter cover may be arranged over the camera assembly lens. The filter cover may be configured to filter light received at the camera assembly to near-infrared light having wavelengths between about 800 nm and 2,500 nm and the camera assembly is configured to capture near-infrared light having wavelengths between about 800 nm and 2,500 nm.

The camera assembly may be configured to capture visible light having wavelengths between about 400 nm and 700 nm.

The radar transceiver may be configured to transmit and detect electromagnetic waves having a wavelength between about 0.3 and 0.5 cm.

The housing may be formed of a heat conducting material.

DETAILED DESCRIPTION

As required, detailed exemplary arrangements of the present disclosure are disclosed herein; however, it is to be understood that the disclosed exemplary arrangements are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Typical sensors used to monitor the interior or cabin of a vehicle include radars and cameras. Interior cameras may be configured to detect visible light and near-infrared light. In vehicles that include interior cameras configured to detect near-infrared light, at least one corresponding near-infrared illuminator is also present in the vehicle to produce near-infrared light for the camera to detect. Near-infrared light is typically used in vehicles to allow the cameras to continue to detect and function at night when visible light is diminished or provide consistent lighting throughout the scene during day. For aesthetic reasons, the near-infrared light illuminators are typically placed behind a cover that allows for the near-infrared light to pass through but is opaque to visible light. Such a cover allows the occupant of the vehicle to see a pleasant cover rather than the illuminator, while still allowing full functionality of the illuminator.

These various sensors, however, are often individual systems that require separate installation by vehicle manufacturers. The installation of each separate system increases the time and therefore the cost for vehicle manufacturers. Accordingly, what is needed is a combined monitoring system with multiple sensors in one housing so as to reduce the number of system components for installation.

Disclosed herein is a monitoring system for an interior of a vehicle having a radar transceiver, and illuminator, and a camera assembly housed in a single housing.

Figure 1:
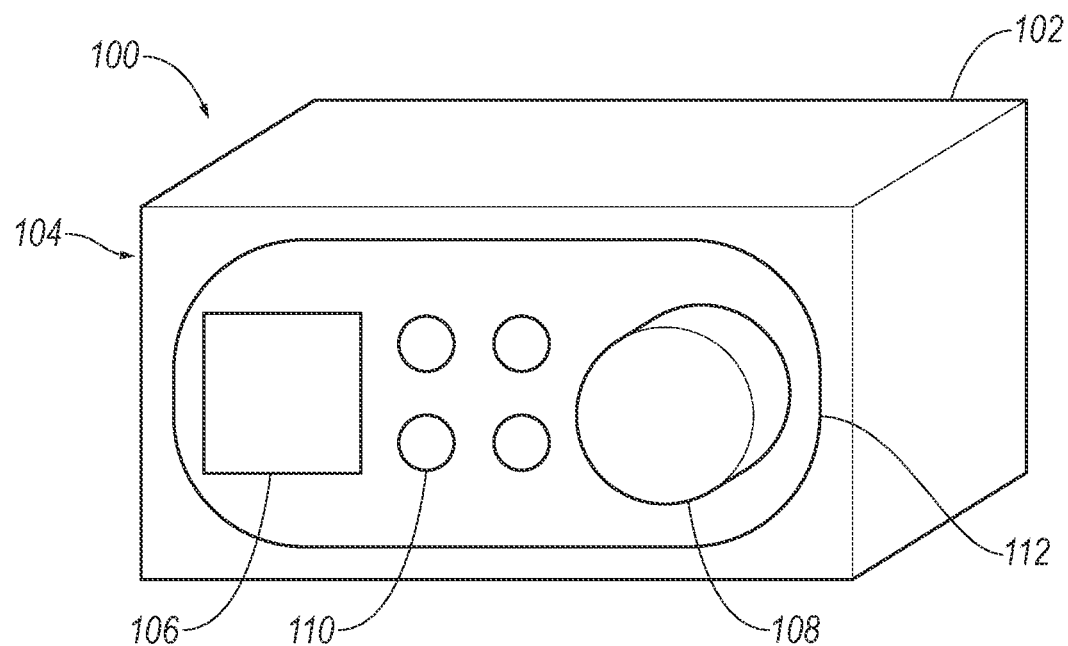
FIG. 1 is a perspective view of a first exemplary arrangement of a monitoring system for an interior of a vehicle.
Figure 2:
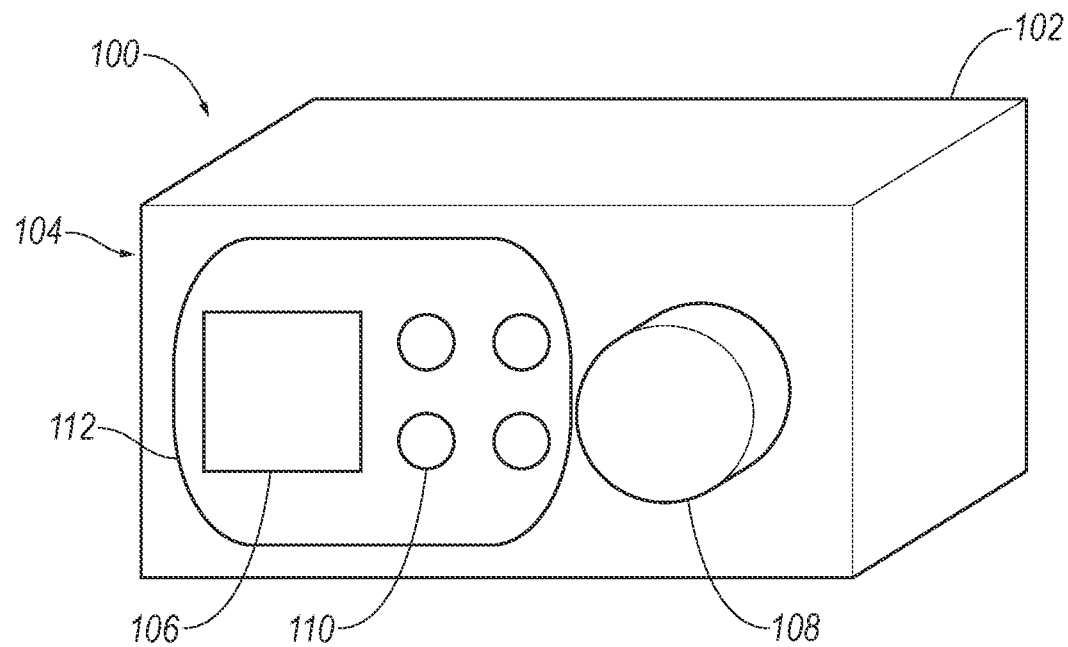
FIG. 2 is a perspective view of a second exemplary arrangement of a monitoring system for an interior of a vehicle.

Referring to FIGS. 1 and 2, a monitoring system 100 is disclosed. The monitoring system may be used to monitor driver alertness through detection of drowsiness or distraction. The monitoring system may be used to identify the driver and adjust conditions of the vehicle, such as seat position and/or temperature of the cabin, based on the driver's preferences. The monitoring system 100 may be arranged within the vehicle, for example, on the vehicle dash, on the interior of the windshield, on the steering column, or on a rear-view mirror, The monitoring system 100 may be part of the vehicle ADAS system. The monitoring system 100 may provide signals to a controller, such as the electronics control unit, body control unit, or other vehicle controllers within, or exterior and remote from the vehicle.

The monitoring system 100 includes a housing 102. The housing 102 may be formed of any heat-conducting material. The housing 102 may be formed of a material containing metal. Exemplary materials may include aluminum, copper, or steel. The housing 102 may form a quadratic shape and may have a first side 104. The first side 104 of the housing 102 may define at least one sensor opening. For example, the first side 104 of the housing 102 may define a radar opening, at least one illuminator opening, and/or a camera opening. The radar, illuminator, and camera openings may be sized and shaped as to accommodate a radar transceiver, at least one illuminator, and camera lens, respectively. For example, camera opening may be of a circular shape to accommodate a camera lens and the radar opening may be of a rectangular shape, as seen in the exemplary arrangements of FIGS. 1 and 2. The radar opening and camera opening may be adjacent to one other or may be spaced on the first side 104 of the housing 102 as to accommodate other openings for additional sensors. The radar opening and/or camera opening may be adjacent to the illuminator opening.

The monitoring system 100 may house a radar transceiver 106. The radar transceiver 106 may allow for detection of occupants in the vehicle, such as detection of a driver located in the driver's seat of the vehicle. The radar transceiver 106 may be used to monitor the interior of a vehicle using electromagnetic waves outside of the range perceivable a human. The radar transceiver 106 may be disposed within the housing 102. The radar transceiver may be exposed, at least partially, at the radar opening of the first side 104 of the housing 102. The radar transceiver 106 may be configured to transmit and detect electromagnetic waves, specifically radar waves. In one example where the housing 102 is formed of metal, all electromagnetic waves detected by the radar transceiver 106 travel through the radar opening of the first side 104 of the housing 102. In one example, the radar transceiver 106 may be configured to transmit and detect electromagnetic waves having frequencies of about 0.5 cm to 0.3 cm. Other frequency ranges may also be contemplated.

The monitoring system 100 includes a camera assembly 108. The camera assembly 108 may be disposed within the housing 102. The camera assembly 108 may have a lens which extends at least partially through the camera opening of the first side 104 of the housing 102. The camera assembly 108 may be configured to capture visible light having wavelengths, in one example, between about 400 nm and about 700 nm, near-infrared light having wavelengths between about 800 nm and 2,500 nm, or a combination thereof. Other wavelength ranges may also be contemplated.

The monitoring system 100 includes at least one illumination device 110. The at least one illumination device 108 may allow for illumination of interior of the vehicle when visible light is not present for the camera assembly 108 to capture. For example, the at least one illumination device 108 may be used to illuminate the interior of the vehicle at night or in tunnels when there is no visible light illuminating the vehicle. The at least one illumination device 110 may be disposed within the housing 102. The at least one illumination device 108 may comprise at least one power source and at least one illuminator. In one example, the at least one illuminator is at least one LED. The at least one illumination device 110 may be arranged as to align the at least one illuminator through the at least one illuminator opening on the first side 104 of the housing 102. The at least one illuminator may be arranged in any formation sufficient to illuminate the interior of the vehicle for detection. In one example, four illuminators are provided in a square formation on the first side 104 of the housing 102. The at least one illumination device 110 may be configured to produce near-infrared light having wavelengths between about 800 nm and 2,500 nm. Other wavelength ranges may also be contemplated.

The monitoring system 100 includes a filter cover 112. The filter cover may be arranged over the first side 104 of the housing 102. The filter cover 112 may be of any size or shape sufficient to cover one of the camera opening and radar opening. The filter cover may be rectangular in shape, rounded rectangular in shape as seen in FIGS. 1 and 2, or oval in shape. The filter cover 112 may be formed of at least one material configured to filter visible light having wavelengths between about 400 nm and about 700 nm. The filter cover 112 may be formed of at least one material selectively transparent to near-infrared light and at least one material selectively transparent to radio waves. The filter cover 112 may be formed of a set of filters each selectively transparent to near-infrared light or radio waves.

In the example of FIG. 1, the filter cover 112 is arranged over the radar transceiver 106, the at least one illuminator 110, and the camera assembly 108. In this exemplary arrangement, the camera assembly 108 is configured to capture near-infrared light as the visible light is filtered through the filter cover 112 and cannot reach the camera assembly 108.

In the example of FIG. 2, the filter cover 112 is arranged over the radar transceiver 106 and the at least one illuminator 110. in this example, the camera assembly 108, however, is not obstructed by the filter cover 112. Because the cover 112 is not obstructing the lens, the camera assembly 108 is configured to capture visible light having wavelengths between about 400 nm and about 700 nm and near-infrared light having wavelengths between about 800 nm and 2,500 nm.

Although not shown, the monitoring system 100 may include a controller configured to receive the images from the camera assembly 108 and signals from the radar transceiver 106. The controller may also provide instructions to the illuminator 110. The controller may be part of the vehicle, or may also be part of the electronics control unit, body control unit, or other vehicle controllers within, or exterior and remote from the vehicle.

Accordingly, the monitoring system disclosed herein allows for a reduction in system components through the combination of multiple sensors into one housing. By reducing the number of system components though combination into a single housing, the installation efforts, time, and costs are reduced for automotive manufacturers.

The exemplary arrangements of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain exemplary arrangements and should in no way be construed so as to limit the claims.

While exemplary arrangements are described above, it is not intended that these exemplary arrangements describe all possible forms of the disclosure. Rather, the words used in the specification are words of description rather than limitation, and it is understood that various changes may be made without departing from the spirit and scope of the disclosure. Additionally, the features of various implementing exemplary arrangements may be combined to form further exemplary arrangements of the disclosure.

What is claimed is:

1. A monitoring system for an interior of a vehicle comprising:
    a housing having a first side and defining a radar opening and a camera opening at the first side;
    a radar transceiver disposed within the housing and exposed at least in part at the radar opening;
    a camera assembly disposed within the housing and having a lens extending at least partially through the camera opening;
    at least one illumination device arranged on the first side of the housing and at least partially contained within the housing; and
    a filter cover arranged over at least the radar opening and illumination device on the first side of the housing for filtering visible light.

2. The monitoring system of claim 1, wherein the filter cover is formed of at least one material selectively transparent to near-infrared light having wavelengths between about 800 nm and 2,500 nm and at least one material selectively transparent to radio waves having wavelengths between about 0.3 and 0.5 cm.

3. The monitoring system of claim 2, wherein the filter cover includes a set of filters, each of the set of filters selectively transparent to near-infrared light or radio waves.

4. The monitoring system of claim 1, wherein the filter cover is formed of at least one material configured to filter wavelengths between about 400 nm and 700 nm.

5. The monitoring system of claim 1, wherein filter cover is arranged over the radar transceiver and at least one illumination device.

6. The monitoring system of claim 5, wherein filter cover is arranged over the camera assembly lens.

7. The monitoring system of claim 6, wherein the filter cover is configured to filter light received at the camera assembly to near-infrared light having wavelengths between about 800 nm and 2,500 nm and camera assembly is configured to capture near-infrared light having wavelengths between about 800 nm and 2,500 nm.

8. The monitoring system of claim 1, wherein the housing is formed of a heat conducting material.

9. The monitoring system of claim 1, wherein the housing is formed of a material containing metal.

10. The monitoring system of claim 1, wherein the housing is formed of at least one of aluminum, copper, or steel.

11. The monitoring system of claim 1, wherein the illumination device is configured to produce near-infrared light having wavelengths between about 800 nm and 2,500 nm.

12. The monitoring system of claim 1, wherein the camera assembly is configured to capture visible light having wavelengths between about 400 nm and 700 nm.

13. The monitoring system of claim 1, wherein the radar transceiver is configured to transmit and detect electromagnetic waves having a wavelength between about 0.3 and 0.5 cm.

14. A monitoring system for an interior of a vehicle comprising:
    a housing having a first side and defining a radar opening and a camera opening at the first side;
    a radar transceiver disposed within the housing and exposed at the radar opening;

a camera assembly disposed within the housing and having a lens extending at least partially through the camera opening;

at least one illumination device arranged on the first side of the housing and at least partially contained within the housing, the at least one illumination device producing near-infrared light having wavelengths between about 800 nm and 2,500 nm; and a filter cover arranged over at least the radar opening and illumination device on the first side of the housing, the filter cover comprising at least one material selectively transparent to near-infrared light having wavelengths between about 800 nm and 2,500 nm and at least one material selectively transparent to radio waves having wavelengths between about 0.3 and 0.5 cm and configured to filter wavelengths between about 400 nm and 700 nm.

15. The monitoring system of claim 14, wherein the filter cover is arranged over the radar transceiver and at least one illumination device.

16. The monitoring system of claim 15, wherein the filter cover is arranged over the camera assembly lens.

17. The monitoring system of claim 16, wherein the filter cover is configured to filter light received at the camera assembly to near-infrared light having wavelengths between about 800 nm and 2,500 nm and the camera assembly is configured to capture near-infrared light having wavelengths between about 800 nm and 2,500 nm.

18. The monitoring system of claim 14, wherein the camera assembly is configured to capture visible light having wavelengths between about 400 nm and 700 nm.

19. The monitoring system of claim 14, wherein the radar transceiver is configured to transmit and detect electromagnetic waves having a wavelength between about 0.3 and 0.5 cm.

20. The monitoring system of claim 14, wherein the housing is formed of a heat conducting material.

* * * * *